(12) United States Patent
Kim et al.

(10) Patent No.: US 7,161,271 B2
(45) Date of Patent: Jan. 9, 2007

(54) MOTOR FOR WASHING MACHINE

(75) Inventors: Deok Jin Kim, Seoul (KR); Young Kwan Kim, Gyeonggi-do (KR); Sung Ho Lee, Seoul (KR); Jin Soo Park, Incheon-si (KR); Jang Ho Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/911,690

(22) Filed: Aug. 5, 2004

(65) Prior Publication Data

US 2005/0200225 A1 Sep. 15, 2005

(30) Foreign Application Priority Data

Mar. 9, 2004 (KR) ............... 10-2004-0015726

(51) Int. Cl.
*H02K 1/00* (2006.01)
(52) U.S. Cl. ..................... 310/216; 310/259
(58) Field of Classification Search ............ 310/49 R, 310/194, 216–218, 254, 258, 259; 68/140, 68/23.7, 123.7
See application file for complete search history.

(56) References Cited

U.S. PATENT DOCUMENTS

| | | | |
|---|---|---|---|
| 3,465,188 A | 9/1969 | Sisk | |
| 5,043,616 A | 8/1991 | Katsuzawa et al. | |
| 5,778,703 A * | 7/1998 | Imai et al. | 68/12.02 |
| 5,996,209 A * | 12/1999 | Molnar et al. | 29/596 |
| 6,088,905 A * | 7/2000 | Boyd et al. | 29/598 |
| 6,121,711 A | 9/2000 | Nakahara et al. | |
| 6,333,579 B1 | 12/2001 | Hirano et al. | |
| 6,734,595 B1 * | 5/2004 | Sakai et al. | 310/254 |
| 6,744,157 B1 | 6/2004 | Choi et al. | |
| 2003/0001452 A1 | 1/2003 | Sakai et al. | |
| 2004/0163428 A1 * | 8/2004 | Kim et al. | 68/140 |

FOREIGN PATENT DOCUMENTS

| | | |
|---|---|---|
| DE | 8909259 | 1/2001 |
| EP | 0017311 | 10/1980 |
| GB | 1100394 | 1/1968 |
| GB | 2183932 | 6/1987 |
| GB | 2325787 | 12/1998 |
| GB | 2332212 | 6/1999 |
| JP | 2-188138 | 7/1990 |
| JP | 8-186969 | 7/1996 |
| JP | 9-191587 | 7/1997 |
| JP | 9-312943 | 12/1997 |
| JP | 11-285182 | 10/1999 |
| JP | 2002-010538 | 1/2002 |
| JP | 2002-186232 | 6/2002 |
| JP | 2003-264945 | 9/2003 |
| KR | 10-2002-0094586 | 12/2002 |
| KR | 10-2003-0021350 | 3/2003 |
| RU | 2058646 | 4/1996 |
| SU | 1628148 | 2/1991 |
| WO | 89/03605 | 4/1989 |

OTHER PUBLICATIONS

English Language abstract of JP-2003-264945.

(Continued)

*Primary Examiner*—Thanh Lam
(74) *Attorney, Agent, or Firm*—Greenblum & Bernstein, P.L.C.

(57) ABSTRACT

A motor for a washing machine includes a stator core having one or more bolt thru holes. A stator assembly having the stator core is directly coupled to a bearing housing using the bolt thru holes.

20 Claims, 6 Drawing Sheets

OTHER PUBLICATIONS

English Language Abstract of KOREAN 10-2003-0021350.
English Language Abstract of KOREAN 10-2002-0094586.
English Language Abstract of JP 2-188138.
English Language Abstract of JP 8-186969.
English Language Abstract of JP 9-191587.
English Language Abstract of JP 9-312943.
English Language Abstract of JP 11-285182.
English Language Abstract of JP 2002-010538.
English language Abstract of SU 1628148.
English language Abstract of RU 2058646.
English Language Abstract of JP 2002-186232.

* cited by examiner

MOTOR FOR WASHING MACHINE

BACKGROUND OF THE INVENTION

1. Field of the Invention

The present invention relates to a motor of a washing machine, and more particularly, to a motor of a washing machine that has a stator designed to be mounted directly on a bearing housing.

2. Description of the Related Art

In a brushless direct drive (BLDC) motor widely used for a washing machine, a torque generated by the BLDC motor is transmitted through a rotational shaft to rotate a drum of the washing machine.

Since the BLDC motors are disclosed in Korean Patent application Nos. 10-2001-0032863, 10-2001-0054478, and so on, detailed descriptions regarding their structures and operations will be omitted.

FIG. 1 is a view of a stator core of a BLDC motor fabricated by a spiral method.

Referring to FIG. 1, the stator core 1 of the BLDC motor includes a spiral core 2 fabricated by a spiral method and an insulator 3 for insulating the spiral core 2 during a winding process.

The insulator 3 includes a rib 4 and an arm 5 for reinforcing strength, and a bolt thru hole 6 through which a bolt passes to mount the spiral core 2 to a bearing housing.

The spiral core 2 cannot be mounted to the bearing housing without using the bolt thru hole 6 of the insulator 3, which complicates a shape of the insulator 3.

Meanwhile, the core 2 fabricated by the spiral method can be weakened in strength although occurrence of scraps can be remarkably reduced and thus manufacturing cost can be reduced.

Therefore, the insulator 3 is changed in shape and is formed with the rib 4 and the arm 5, thereby reinforcing the strength of the core 2.

However the changed shape, and the rib 4, and the arm 5 of the insulator 3 cause an acoustic noise and a vibration during operation of the motor.

Further, the more number of parts are required to make the stator core 1, thereby increasing the manufacturing costs and processes.

Furthermore, the prior art cores fabricated by the spiral method cannot be mounted to the bearing housing by itself, which complicates the shape of the insulator and increases manufacturing costs of the motor.

SUMMARY OF THE INVENTION

Accordingly, the present invention is directed to a motor for a washing machine that substantially obviates one or more problems due to limitations and disadvantages of the related art.

An object of the present invention is to provide a motor for a washing machine that has a modified stator shape so that a stator thereof can be mounted directly to a bearing housing thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a motor for a washing machine includes a bearing housing; a stator assembly including a stator core and an insulator for insulating the stator core, the stator core having one or more bolt thru holes; and a rotor assembly rotated by an interaction with the stator assembly.

The washing machine motor according to the present invention provides the stator that can be mounted directly to the bearing housing without additional parts so that reduces parts and processes to be used, thereby attaining cost reduction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
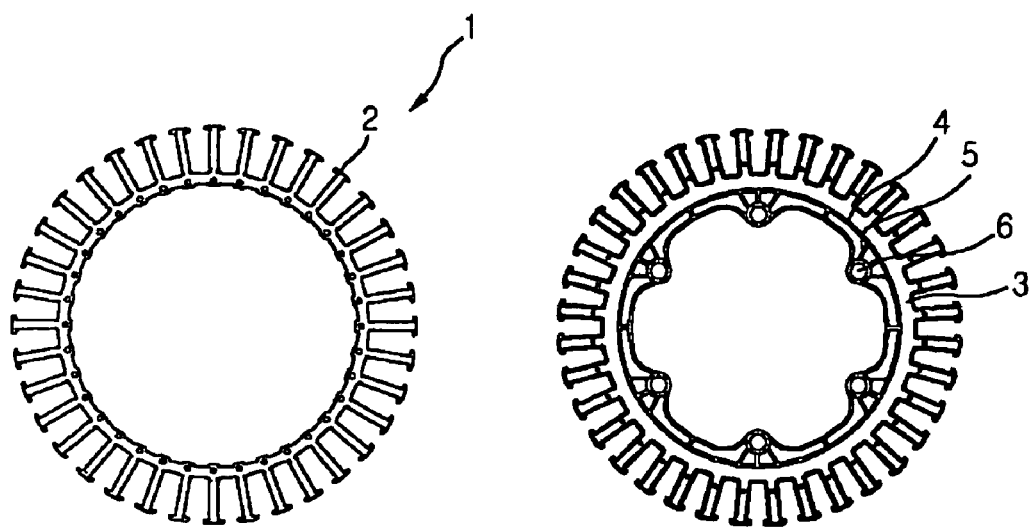
FIG. 1 is a view showing a stator core of a BLDC motor fabricated by spiral method.
Figure 2:
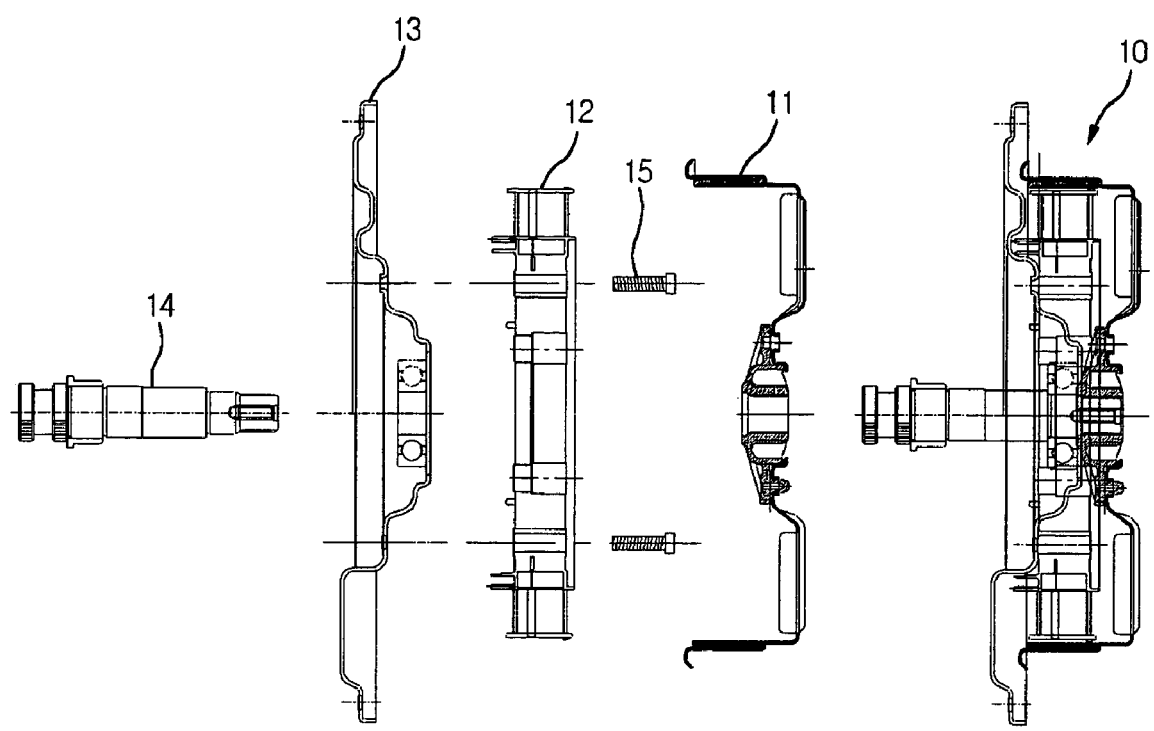
FIG. 2 is an exploded sectional view of a motor for a washing machine according to the present invention.

FIG. 2 is an exploded sectional view of a motor for a washing machine according to the present invention.

Referring to FIG. 2, the motor 10 for a washing machine includes a rotor assembly 11 and a stator assembly 12 which interact each other to generate a torque.

Further, the motor 10 includes a bearing housing 13 with which the stator assembly 12 is coupled and a shaft 14 for transmitting a torque of the motor 10, the stator assembly 12 including one ore more bolts 15 for coupling with the bearing housing 13.

The stator assembly 12 has a stator core in which bolt thru holes are formed, the stator core and the bolt thru holes being described in detail later. The bolts 15 pass through the bolt thru holes in order to couple the stator core and the bearing housing directly, thereby attaining an easy assembling of the motor 10.

In other words, the bolt thru holes allows the stator assembly 12 to be mounted directly on the bearing housing 13 without additional parts, thereby reducing manufacturing costs and processes.

Further, the direct mounting of the stator assembly 12 prevents vibration and acoustic noise of the washing machine motor 10.

Figure 3:
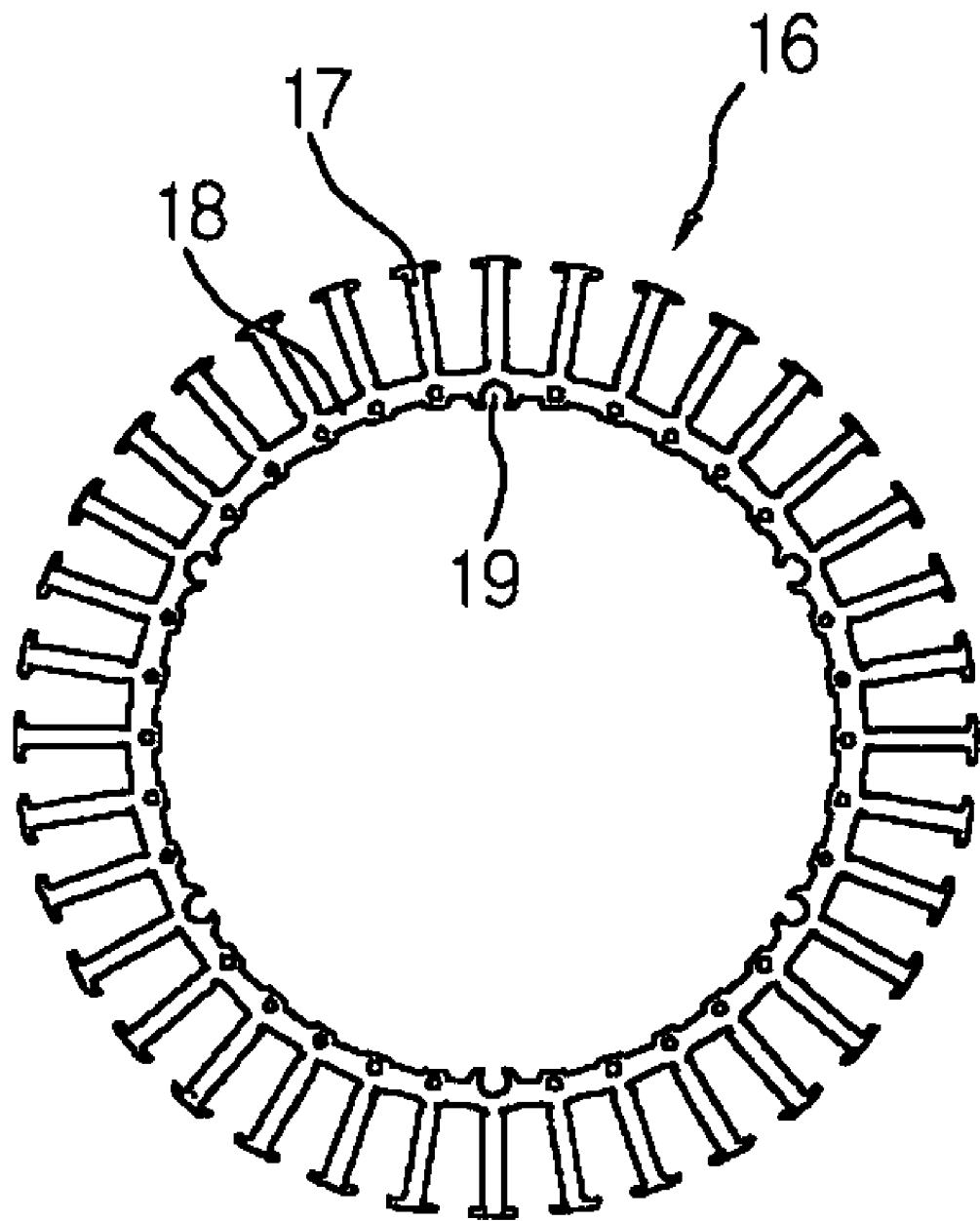
FIG. 3 is a view showing a stator core of a motor for a washing machine according to the present invention.

FIG. 3 is a view showing the stator core of the washing machine motor according to the present invention.

Referring to FIG. 3, the stator core 16 is fabricated by a spiral method including a first process and a second process. In the first process, a linear shape core is formed. In the second process, the linear shape core is made in a circular shape.

The stator core 16 includes teeth 17 around which a wire is wound and a core frame 18 from which the teeth 17 extend.

The core frame 18 includes one or more bolt thru holes 19 for the stator core 16 to be mounted on the bearing housing, such that additional parts are not required for mounting the stator 16, thereby reducing manufacturing costs and processes.

Figure 4:
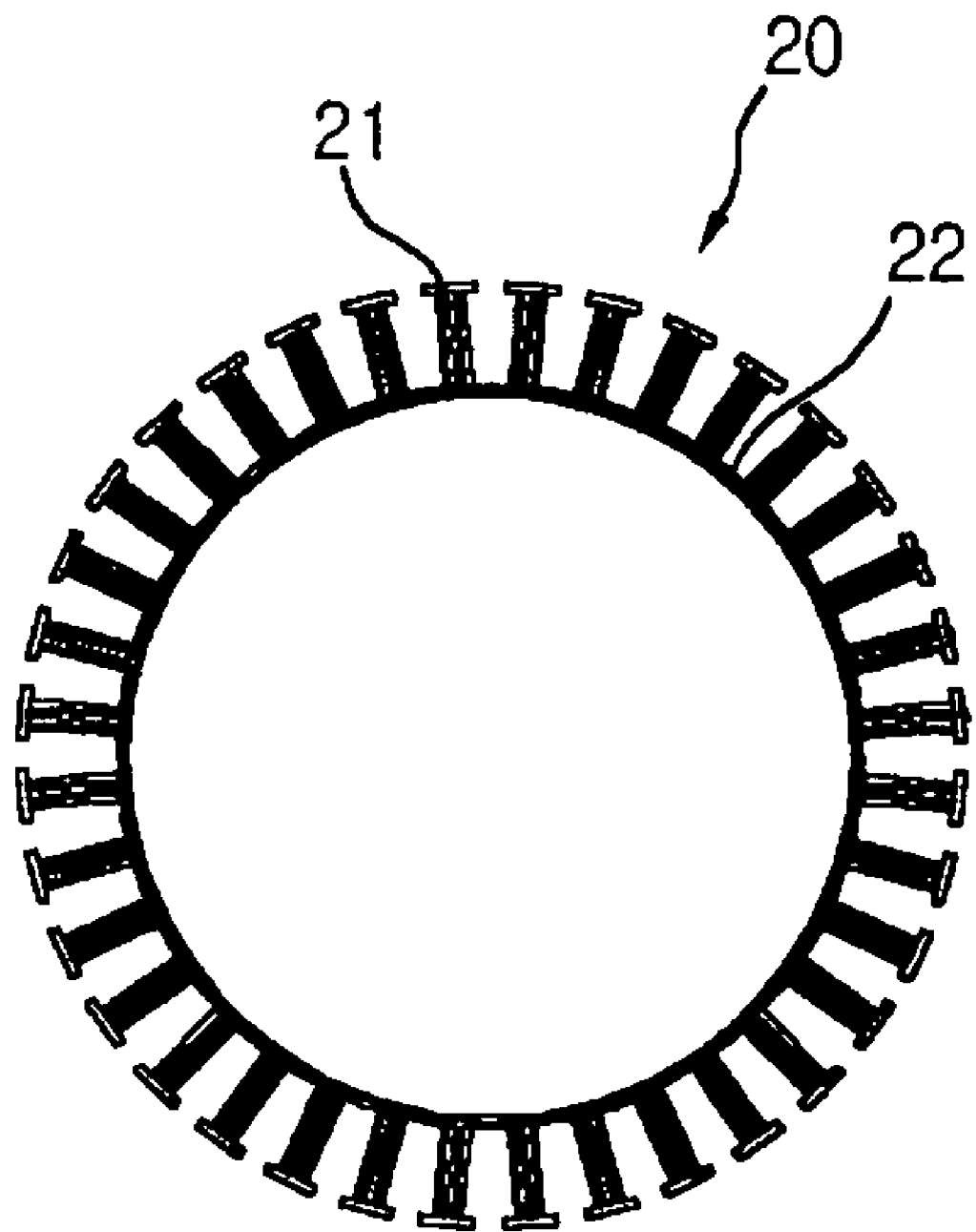
FIG. 4 is a view showing an insulator of a motor for a washing machine according to the present invention.

FIG. 4 is a view showing an insulator of the washing machine motor according to the present invention.

Referring to FIG. 4, the insulator 20 includes teeth 21 for insulating the teeth 17 of the stator core and a rim 22 for insulating the core frame 18.

The insulator 20 is not formed with a hole for a bolt because one or more bolt thru holes are formed in the core frame 18.

Therefore, it is not necessary for the insulator 20 to form the bolt thru holes, and a rib or an arm thereon, thereby attaining a simple shape and cost cutting.

Figure 5:
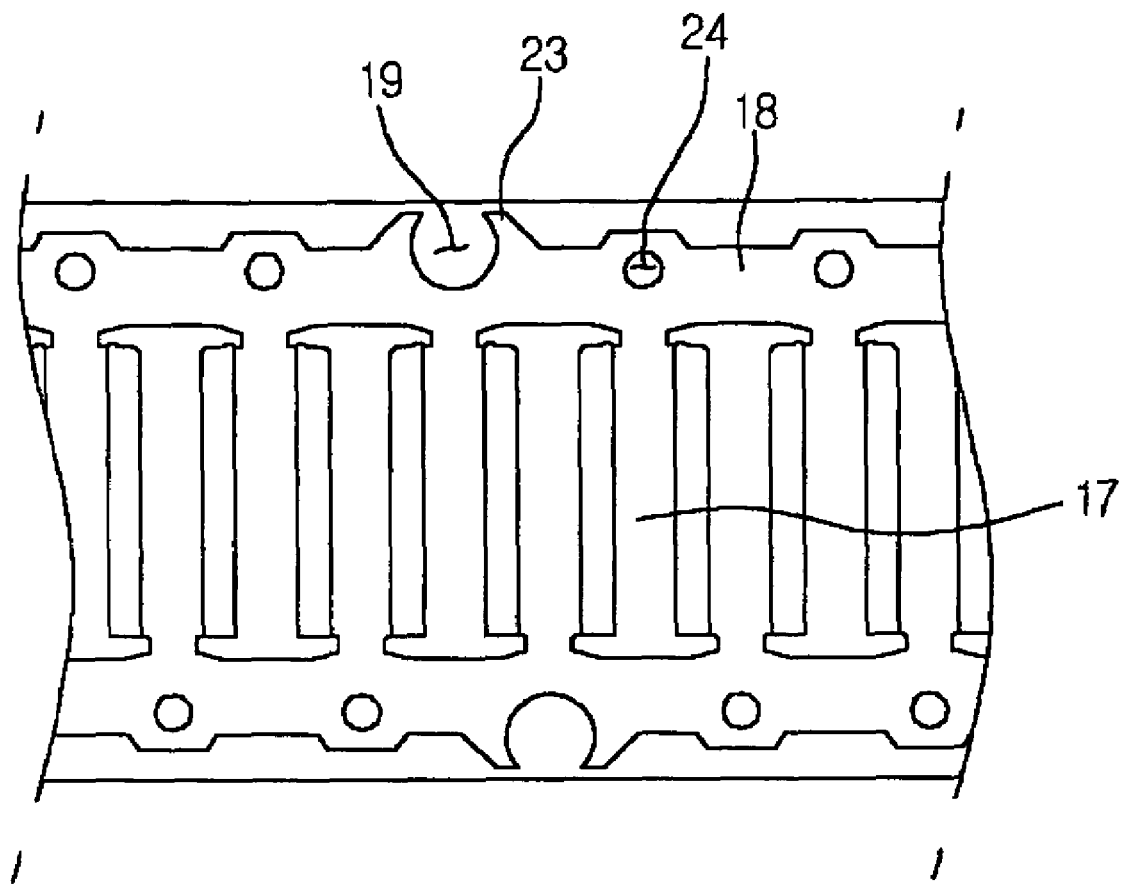
FIG. 5 is a view showing a stator core of a motor for a washing machine after a first process of a spiral method according to the present invention.

FIG. 5 is a view showing the stator core 16 of the inventive washing machine motor 10 after the first process of the spiral method is completed.

The stator core 16 when the first process is completed includes the teeth 17 for winding a wire and the core frame 18 from which the teeth 17 extend.

The core frame 18 includes the one or more bolt thru holes 19, which are spaced away from each other at a predetermined distance along with a straight line of the first processed stator core 16.

Further, the core frame 18 includes one or more denticles 23 extending therefrom in other to form the bolt thru holes 19 and one or more frame holes 24.

The one or more denticles 23 may be formed on each side of the bolt thru holes 19, i.e., two denticles 23 for one bolt thru hole 19.

Also, the two denticles 23 are not in contact with each other such that the bolt thru holes 19 are opened at a predetermined portion thereof with a bent shape.

When the stator core is wound in the circular shape in the second process of the spiral method, the core frame 18 is directed toward an interior of the circle and the teeth 17 is directed toward an exterior of the circle.

Therefore, the two denticles 23 approach each other by a predetermined distance such that the opened portions of the bolt thru holes 19 are narrowed.

That is, the opened portions of the bolt thru holes 19 provide spaces for the denticles 23 such that the denticles are curved inwardly without deforming the bolt thru holes 19 during the second process. The opened portions also make the bolt fastening easy.

Since the bolts 15 usually have a circular cross section, the bolt thru holes 19 may be formed in an arc shape having a predetermined radius such that the bolts 15 are easily fastened.

Each of the bolt thru holes 19 has to have a diameter that is equal or a little bigger than that of each of the bolts 15 such that the bolts 15 can pass through.

Figure 6:
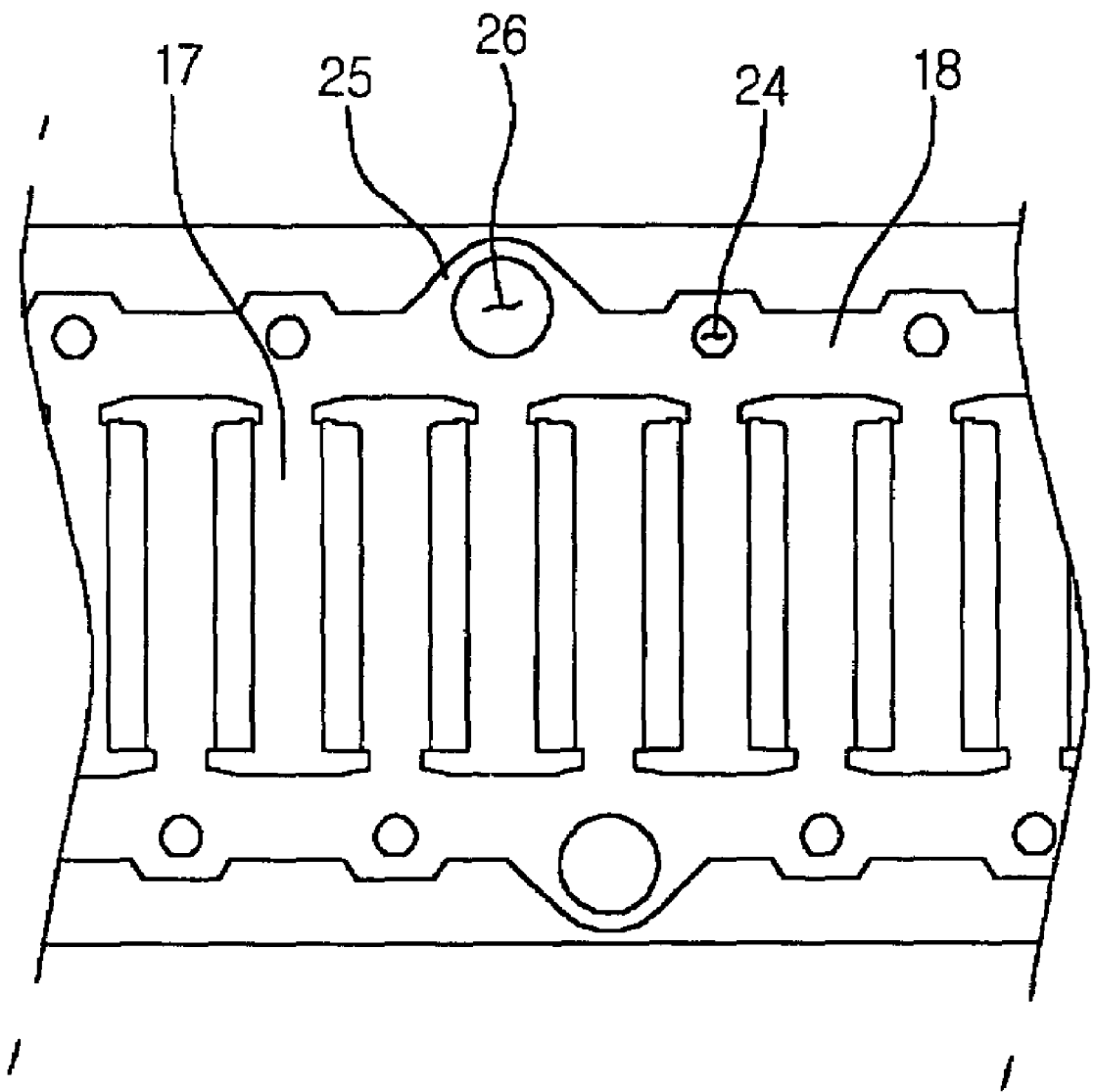
FIG. 6 is a view showing a stator core of a motor for a washing machine after a first process of a spiral method according to another embodiment of the present invention.

FIG. 6 is a view showing a stator core 16 of a motor for a washing machine 10 after a first process of a spiral method according to another embodiment of the present invention.

Referring to FIG. 6, the stator core 16 when the first process of the spiral method is completed includes teeth 17 around which a wire is wound and a core frame 18 from which the teeth 17 extend.

The core frame 18 includes one or more bolt thru holes 26 spaced away from each other at a predetermined distance along with a straight line of the first processed stator core 16.

Further, the core frame 18 includes one or more frame holes 24 and an arc edge 25 extending therefrom in other to form the bolt thru holes 26.

Though the bolt thru holes 26 may be formed in a circular shape such that the bolts 15 are easily fastened, the present invention is not limited to the circular shape.

The bolt thru holes 26 are formed in a closed circular shape including the arc edge 25 such that prevents the bolt 15 from departing after coupling, thereby improving a coupling stability.

It will be apparent that shapes of the bolt thru holes are not limited to those described in the embodiments of FIGS. 5 and 6 but various shapes can be proposed if the bolt can couple the stator core and the bearing housing.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A motor for a washing machine, comprising:
   a bearing housing;
   a stator assembly including a stator core having a generally circular shape and an insulator for insulating the stator core, the stator core having one or more bolt thru holes that are located at an inner circumference of the stator core and that open towards a center of the stator core; and
   a rotor assembly configured to rotate by an interaction with the stator assembly,
   whereby diameters of the bolt thru holes become smaller as the stator core is curved into the generally circular shape.

2. The motor of claim 1, wherein the one or more bolt thru holes have a bent shape.

3. The motor of claim 1, wherein the one or more bolt thru holes have a diameter, which is equal to or a little bigger than that of a bolt to be inserted therethrough.

4. The motor of claim 1, wherein the bolt thru holes are spaced apart by a predetermined distance.

5. The motor of claim 1, wherein the stator core comprises a core frame and teeth.

6. The motor of claim 1, wherein the stator core comprises at least one denticle on a predetermined portion thereof.

7. The motor of claim 1, wherein the stator core comprises two denticles one on each side of the one or more bolt thru holes.

8. The motor of claim 1, wherein the stator core comprises one or more frame holes.

9. The motor according to claim 1, wherein said one or more bolt thru holes intersect an inner periphery of the stator core.

10. The motor according to claim 1, said insulator being free of bolt thru holes.

11. The motor according to claim 1, said bolt thru holes configured to receive bolts extending through said bolt thru holes to engage a bearing housing.

12. The motor according to claim 1, said stator core configured to have a linear configuration and to be curved into a generally circular shape, curving of the stator core member serving to decrease the diameter of the bolt thru holes.

13. A motor for a washing machine;
   a stator assembly including a stator core having a generally circular shape and an insulator for insulating the stator core, the stator core having at least one bolt through hole that is configured to receive a bolt, the bolt through holes being positioned to intersect an inner circumferential surface of the stator core; and
   a rotor assembly configured to rotate by an interaction with the stator assembly,
   whereby diameters of the bolt through holes become smaller as the stator core is curved into the generally circular shape.

14. The motor of claim 13, wherein the at least one bolt through hole has a bent shape.

15. The motor of claim 13, wherein the at least one bolt through hole has a diameter at least equal to a diameter of the bolt to be received therein.

16. The motor according to claim 13, wherein the stator core comprises a core frame with teeth extending radially from the core frame.

17. The motor of claim 13, wherein the stator core comprises at least one denticle on a predetermined portion thereof.

18. The motor of claim 13, wherein the stator core comprises two denticles, one on each side of the at least one bolt through hole.

19. The motor of claim 13, wherein the stator core comprises at least one frame hole that does not intersect the inner circumference of the stator core.

20. The motor according to claim 13, the insulator being free of bolt through holes.

* * * * *